United States Patent [19]

Patterson et al.

[11] Patent Number: 4,969,061
[45] Date of Patent: Nov. 6, 1990

[54] PARTICULATE REMOVING MEANS FOR CARTRIDGES

[75] Inventors: Robert Patterson, Ogden; Roy J. Orr, Salt Lake City, both of Utah

[73] Assignee: Iomega Corporation, Roy, Utah

[21] Appl. No.: 300,784

[22] Filed: Jan. 23, 1989

[51] Int. Cl.⁵ .................... G11B 23/03; G11B 5/012
[52] U.S. Cl. .................... 360/133; 360/97.02
[58] Field of Search ........... 360/133, 128, 137, 97.02, 360/97.04, 99.01–99.02; 206/444

[56] References Cited

U.S. PATENT DOCUMENTS

| 4,400,748 | 8/1983 | Bauck et al. | 360/99.02 |
| 4,658,318 | 4/1987 | Bauck et al. | 360/133 |
| 4,743,989 | 5/1988 | Bauck et al. | 360/133 |
| 4,768,124 | 8/1988 | Bauck et al. | 360/133 |
| 4,769,733 | 9/1988 | Freeman et al. | 360/133 |

*Primary Examiner*—John H. Wolff
*Attorney, Agent, or Firm*—Woodcock Washburn Kurtz Mackiewicz & Norris

[57] ABSTRACT

A cartridge, having recording media rotatably mounted therein, is shown to include an enclosure substantially surrounding the media and defining a chamber, wherein a differential pressure region is created when the media is rotating. The enclosure is further shown to have a passage, wherein at least one end of said passage is in communication with the differential pressure region so that air moves through said passage. A filter is also shown positioned within said passage to remove particulate material from air flowing through the passage.

14 Claims, 8 Drawing Sheets

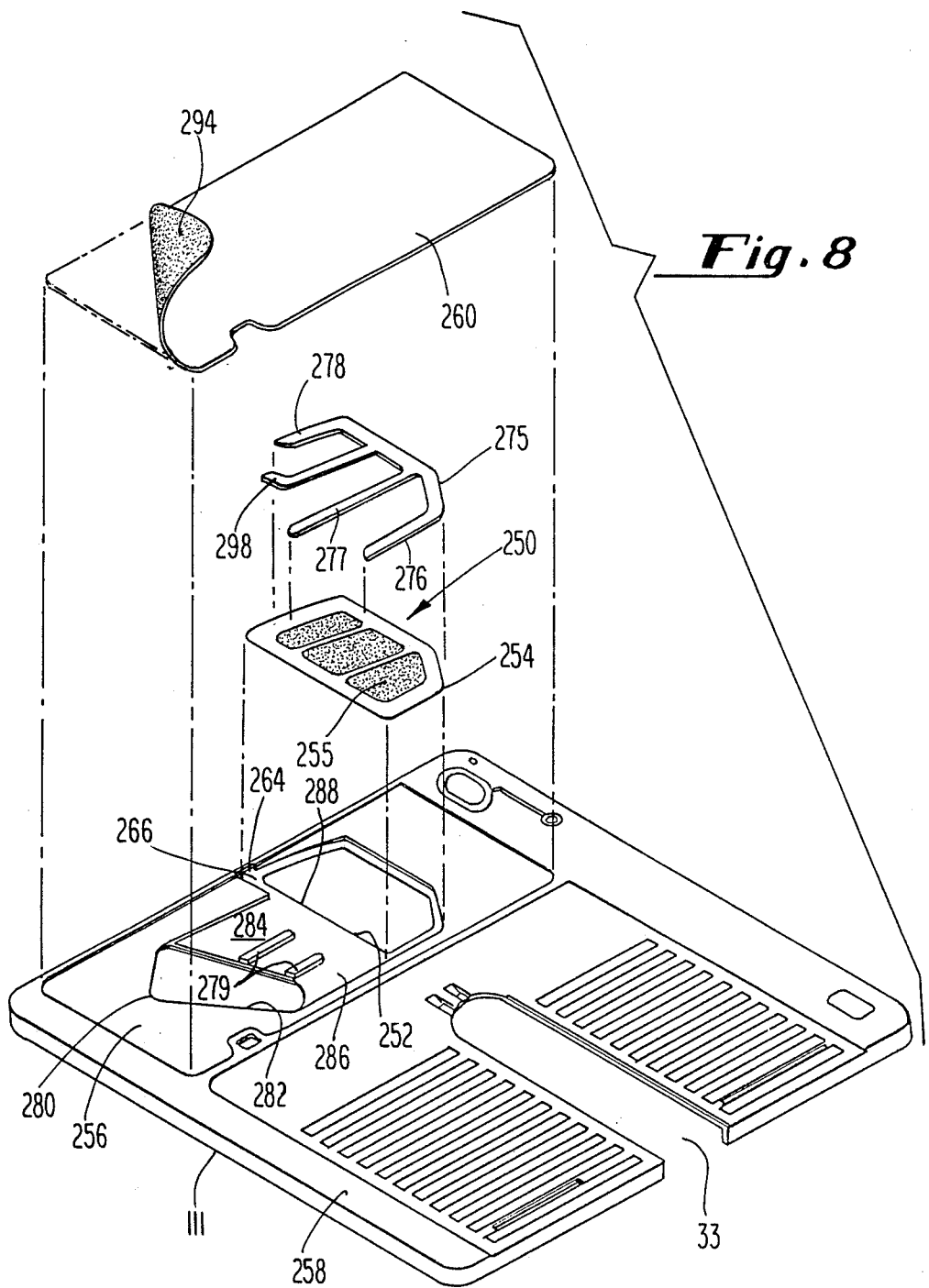

PARTICULATE REMOVING MEANS FOR CARTRIDGES

BACKGROUND OF THE INVENTION

This invention relates to disk cartridges. More particularly, this invention relates to disk cartridges of the type having rotatable recording media means mounted therein and to particulate removing means for removing particulates from air which flows in proximity to the recording media means.

The present invention will be described in detail in association with magnetic disk cartridges of the type having rotatable flexible magnetic disk means mounted therein. It is to be understood, however, that the invention is not limited to any particular recording media, size of recording media or format and that the invention is also applicable to non-flexible or rigid recording media as well as to optical recording media of various sizes and formats.

In U.S. Pat. No. 4,769,733, assigned to the same assignee as the subject application, there is disclosed a magnetic data storage cartridge wherein two magnetic disks or a disk pair are coaxially joined and axially spaced such that during high speed rotation of the disks, a continuous air bearing exists between the functional portions of the disks. An inter-disk wiper is interposed between the disks and contacts the inner surfaces of the disks. Top and bottom wipers contact the outside surfaces of the disks. The bottom wiper is staked to the inside of the cartridge along one edge. The bottom wiper extends over a rib on the inside of the cartridge so that the wiper is biased toward the disk. The flexibility of the wiper material loads the wiper against the disk. This obviates what might otherwise be a problem of proper spacing from the inside of the cartridge to the disk. The top wiper is secured by adhesive to the inside of the cover so that it contacts the outer surface of the other disk.

The wipers cover only a portion of the disk surface and are positioned at the back of the cartridge with respect to the location in which two substantially opposed transducers are brought into read/write relationship with the outer surfaces of the disks when the cartridge is inserted into a magnetic disk drive. This produces minimum interference with the stability of the rotating disks in the area of the transducers.

The purpose of the wipers, as disclosed in this patent, was, among other things, to stabilize the disks in order that the two substantially opposed transducers could simultaneously access the outer surfaces of the two disks without causing substantial deformation of either disk by the transducer positioned adjacent to the opposite disk. The inter-disk wiper was also disclosed as serving to remove contaminates from between the disks as the disks were rotated and the top and bottom disk wipers were positioned to wipe the outside surfaces of the disk pair to wipe away any foreign materials on these surfaces.

It may be explained here that the surface to which the top wiper is secured is a Bernoulli surface against which in operation the top disk is rotated at high speed. During high speed rotation, in a manner known to those skilled in the art, an air bearing is formed between the surface of the top disk and the Bernoulli surface and the air bearing stabilizes the top disk. In a manner as disclosed in this cited patent, the bottom disk is in turn stabilized by rotation in juxtaposition to the stabilized surface of the upper disk. In this manner, both disks are stabilized by a single Bernoulli surface.

Such high speed rotation of the disks causes large volumes of air to be moved in and throughout the cartridge. In addition, air is both drawn into the cartridge and expelled from the cartridge. It will be appreciated that any particulates carried in the air drawn into the cartridge or carried in the air moving within the cartridge can have a detrimental affect on the record media, the transducers or their operation. This is especially so at the transducer disk interface where such particulates can cause excessive wear and also interfere with proper read/write operations.

SUMMARY OF THE INVENTION

In accordance with the present invention, a disk cartridge of the type having a rotatable recording media means mounted therein comprises an enclosure in which the recording media means is rotatably mounted. The cartridge further includes particulate removing means for removing particulates from air which flows in proximity to the recording media means. Rotation of the recording media means effects a high pressure zone and a low pressure zone within the enclosure. The particulate removing means is positioned in operative relationship to the enclosure and the high and low pressure zone for removing particulates from air which flows in proximity to the recording media means.

The foregoing and other features, objects and advantages, according to the present invention will be more fully appreciated and become more apparent from consideration of the following description of preferred embodiments of the invention, taken in conjunction with the attached drawing wherein like reference numerals refer to like parts throughout the several drawings.

BRIEF DESCRIPTION OF THE DRAWINGS

FIG. 8 is an exploded view of the opposite side of the top portion of the cartridge shown in FIG. 1 as modified in accordance with a fourth and most preferred embodiment of the present invention;

DETAILED DESCRIPTION OF THE PREFERRED EMBODIMENTS

Figure 1:
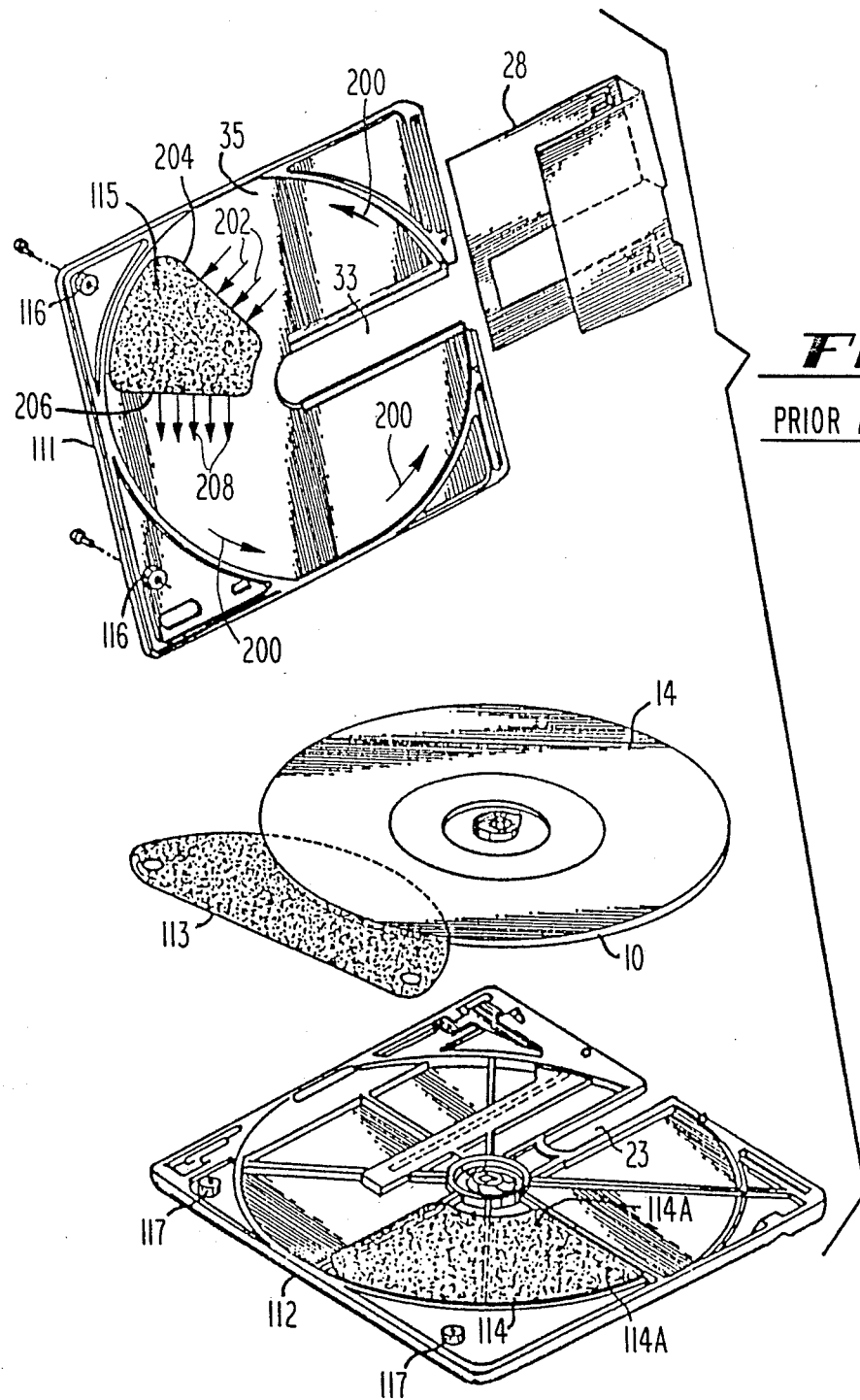
FIG. 1 is substantially a duplicate of FIG. 6 of the cited U.S. Pat. No. 4,769,733, namely, an exploded perspective view of the disk cartridge made according to a preferred embodiment of that invention which shows the interior surfaces of the cartridge and the disks contained within the cartridge.
Figure 6:
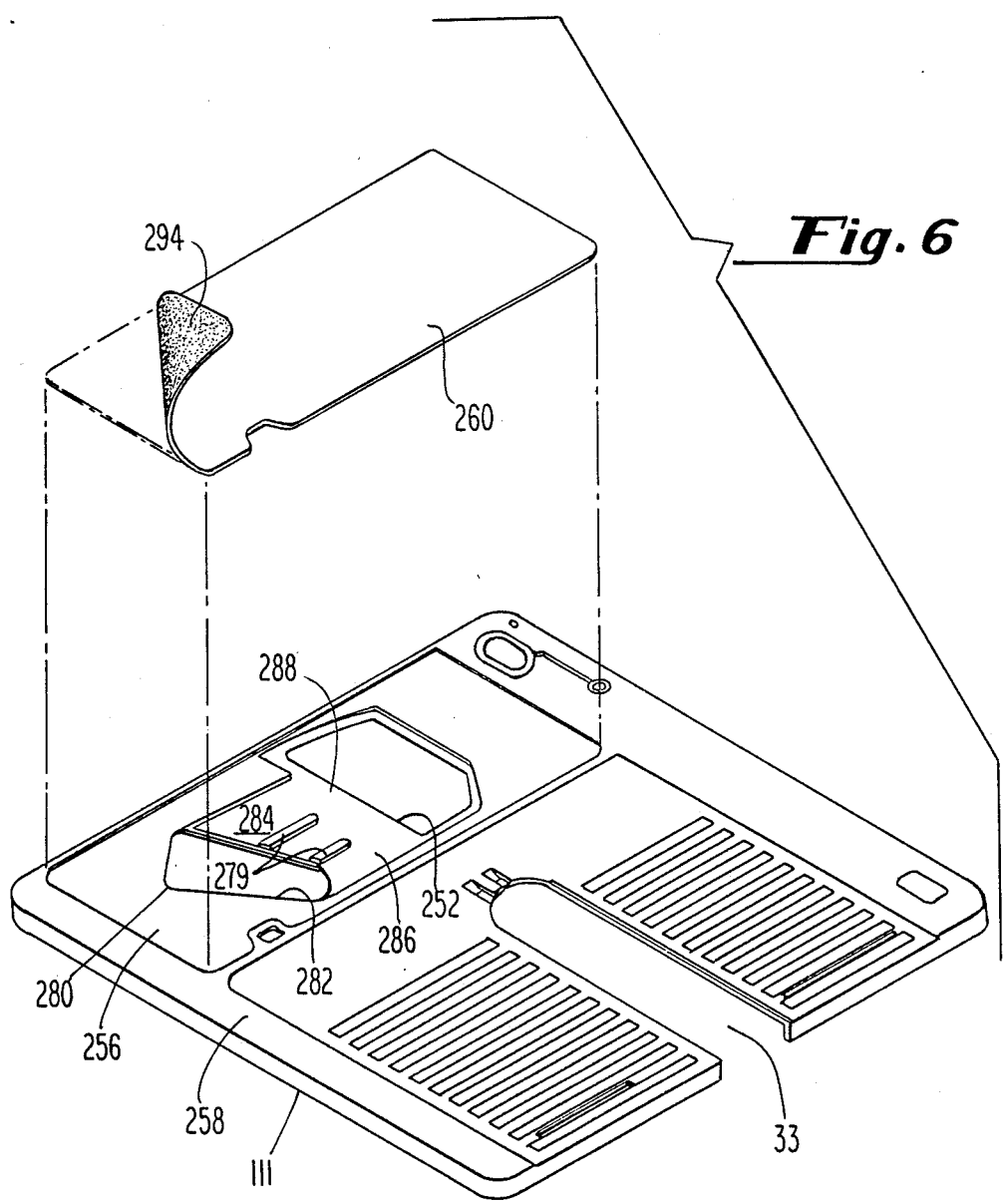
FIG. 6 is an exploded view of the opposite side of the top portion of the cartridge shown in FIG. 1 as modified in accordance with a third embodiment of the present invention.

Referring now to FIG. 1, which as indicated above is substantially a duplicate of FIG. 6 of U.S. Pat. No. 4,769,733, the same reference numerals will be used herein to describe FIG. 1 as those used in the cited patent to describe FIG. 6 of that patent. Also, the description of FIG. 1 will generally parallel the description of FIG. 6 of the cited patent. Additional reference numerals and descriptions, however, will be used in describing FIG. 1 and only that description of FIG. 1 which is required to establish the environment of the present invention will be set forth in reference to FIG. 1. A more detailed description of the various elements of FIG. 1 together with the structural and functional interrelationship of the various parts depicted in FIG. 1 and their interrelationship to the transducers and disk drive with which the cartridge is utilized can be had with reference to U.S. Pat. No. 4,769,733, which is hereby incorporated herein by reference.

FIG. 1 shows the inside surface of cartridge cover or top portion 111; the inside surface of cartridge bottom portion 112; inter-disk wiper 113 sandwiched by disk pair 10 and 14; and shutter 28. In assembled form, disks 10 and 14 are contained within the chamber or enclosure formed by the joining of generally planar cartridge bottom portion 112 and generally planar cartridge top portion 111, and shutter 28 is slidably mounted on the cartridge. Bottom disk wiper 114 is heat staked to the cartridge bottom portion 112 at heat stake points 114A. When in assembled form, the lower surface of disk 10 contacts bottom disk wiper 114. When the cartridge is inserted into a disk drive and disk pair 10, 14 is rotated thereby in a manner known to those skilled in the art, any foreign materials on the underside of disk 10 are wiped away as the disk 10 contacts bottom disk wiper 114. Inter-disk wiper 113 is sandwiched between disk 14 and disk 10 and serves to remove contaminates from between the disk pair as the disks rotate. Hold down nodes 116 in cartridge top 111 engage hold down nodes 117 in cartridge bottom 112 and hold inter-disk wiper 113 within the cartridge and between the disks. Top wiper 115 is adhesively joined to Bernoulli surface 35 and wipes the upper surface of disk 14 as it rotates. It should be noted here that the wiping actions described are to be distinguished from the removal of particulates from air in close proximity to the disks in accordance with the present invention as will be described below with reference to FIGS. 2-11. Apertures 23 and 33 are provided in the cartridge and it is in region of these apertures that transduction of data takes place in a manner as is well known to those skilled in the art.

When the disk pair 10, 14 is rotated, the directions of rotation is that shown by the arrows 200 on the inside surface of cartridge top portion 111. Applicants have discovered that rotation of the disk pair 10, 14 (disk 14 in contact with the disk wiper 115) effects a high pressure zone in the region of the arrows 202, i.e., in viewing FIG. 1, the high pressure zone is effected in the region along the side of the top wiper 115 designated by the reference numeral 204 and slightly ahead of the disk wiper 115. Along the opposite side 206 of disk wiper 115 and in the region of the arrows 208 a low pressure zone is effected. Actual mapping measurements of these two zones has indicated that the low pressure zone is comprised of a negative pressure zone relative to ambient air pressure. As will be explained more fully hereinafter, in accordance with the invention, advantage is taken of the high and low pressure zones created on either side of the top disk wiper 115.

Figure 2:
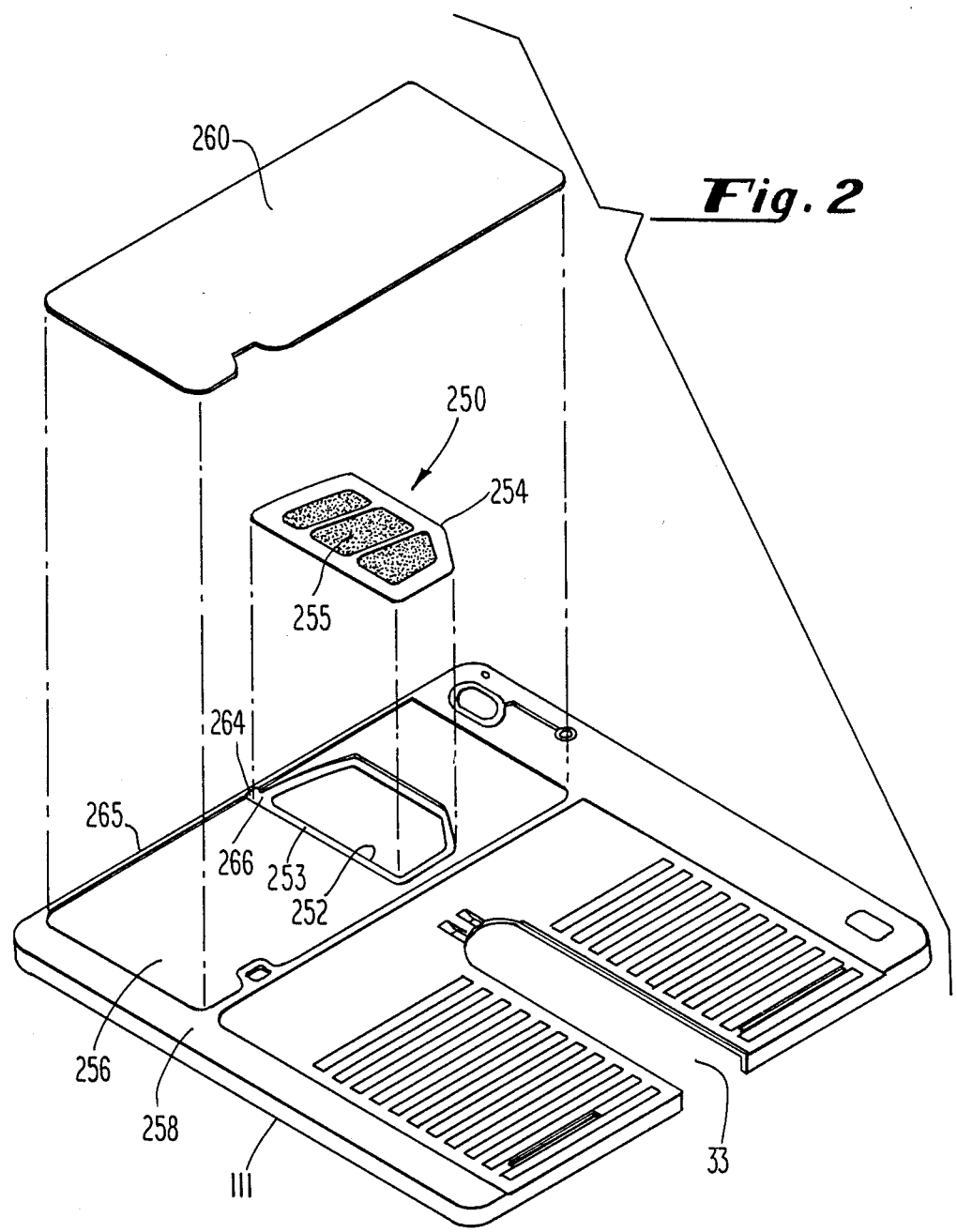
FIG. 2 is an exploded view of the opposite side of the top portion of the cartridge shown in FIG. 1 as modified in accordance with a first embodiment of the present invention.
Figure 3:
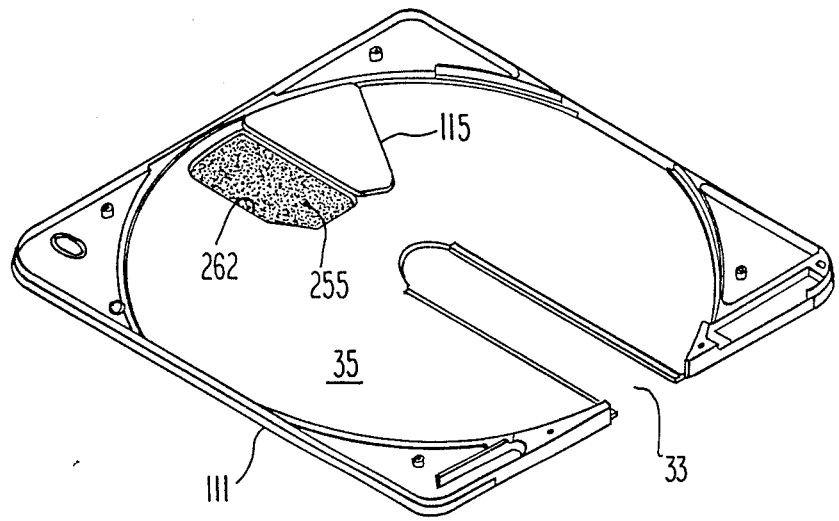
FIG. 3 is a view of the opposite side of FIG. 2.

Referring now to FIGS. 2 and 3, a first embodiment of a cartridge in accordance with the invention is depicted. In this first embodiment of the invention, advantage is taken of the low pressure zone created within the cartridge when the disk pair 10, 14 is rotated. In this first embodiment of the invention, outside air is drawn into the cartridge and particulates are removed from this air, i.e., the air is filtered; the air already in the cartridge is not filtered.

FIG. 2 is an exploded view of the opposite side of the top portion 111 of the cartridge shown in FIG. 1 as modified in accordance with the first embodiment of the invention. A particulate removing means or filter is designated generally by the reference numeral 250. The filter 250 is located across opening 252 provided in cartridge top portion 111. The filter 250 includes a frame 254 and a filter media 255 comprised of any suitable filtering media as for example, Filtrete brand air filter media manufactured by 3M Filtration Products. The thickness of the filter media is approximately equal to one half the thickness of the cartridge top portion 111 in the area of the opening 252. The peripheral edges of the frame 254 are secured to the peripheral edges of opening 252 by any suitable means, as for example, by an adhesive. The peripheral edges of the opening 252 are recessed as at 253 relative to the surface 256 which, in turn, is recessed relative to the outside surface 258 of cartridge top portion 111. The recessed peripheral edges 253 of the opening 252 are sized to accommodate the thickness of the peripheral portions of frame 254 of filter 250.

When the filter 250 is in place, the filter media 255 depends from the undersurface of frame 254 and extends inwardly towards the interior of the cartridge. A thin cover plate 260 is sized to be received on recessed surface 256. Cover plate 260 may be secured to recessed surface 256 by any suitable means, as for example by an adhesive. With cover plate 260 secured in place on the recessed surface 256, the opening 252 is closed and, as best seen in FIG. 3, a recessed area or passage 262 is defined in the inside surface 35 of cartridge top portion 111. The filter media 255 fills the recessed area 262.

A slot or air inlet 264 is provided in the edge 265 of outside surface 258 and an air channel 266 is provided in recessed surface 253 in order that air inlet 264 be in air flow communication with the recessed area 262 in which filter 250 is disposed.

The recessed area 262 in which the filter 250 is positioned is in the low pressure zone created when the disk pair 10, 14 is rotated. Because the low pressure zone is comprised of a negative pressure zone relative to ambient air pressure, outside air is forced through the filter 250 by way of air inlet 264 and channel 266 and into the cartridge. The filtered air is generally at a lower temperature than air that has been circulating inside the cartridge. The filtered air, at lower temperature provides, an improved atmosphere for the operation of the transducer to disk interface.

Figure 5:
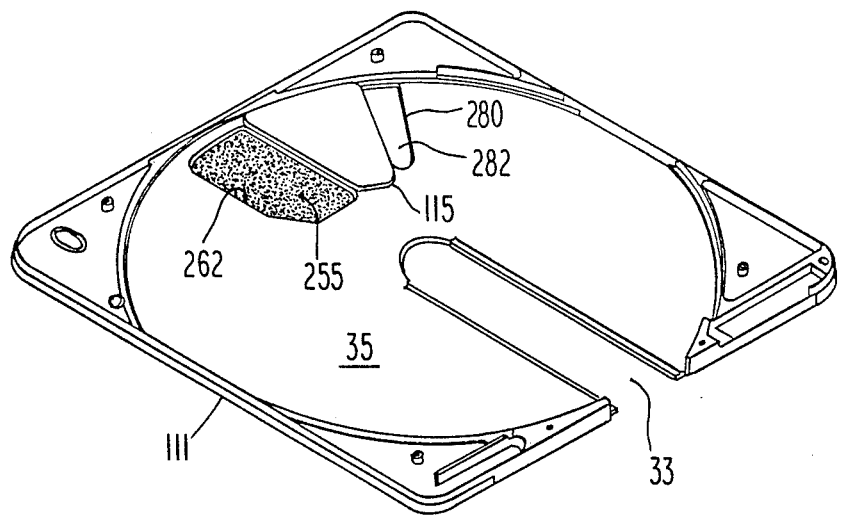
FIG. 5 is a view of the opposite side of FIG. 4.
Figure 4:
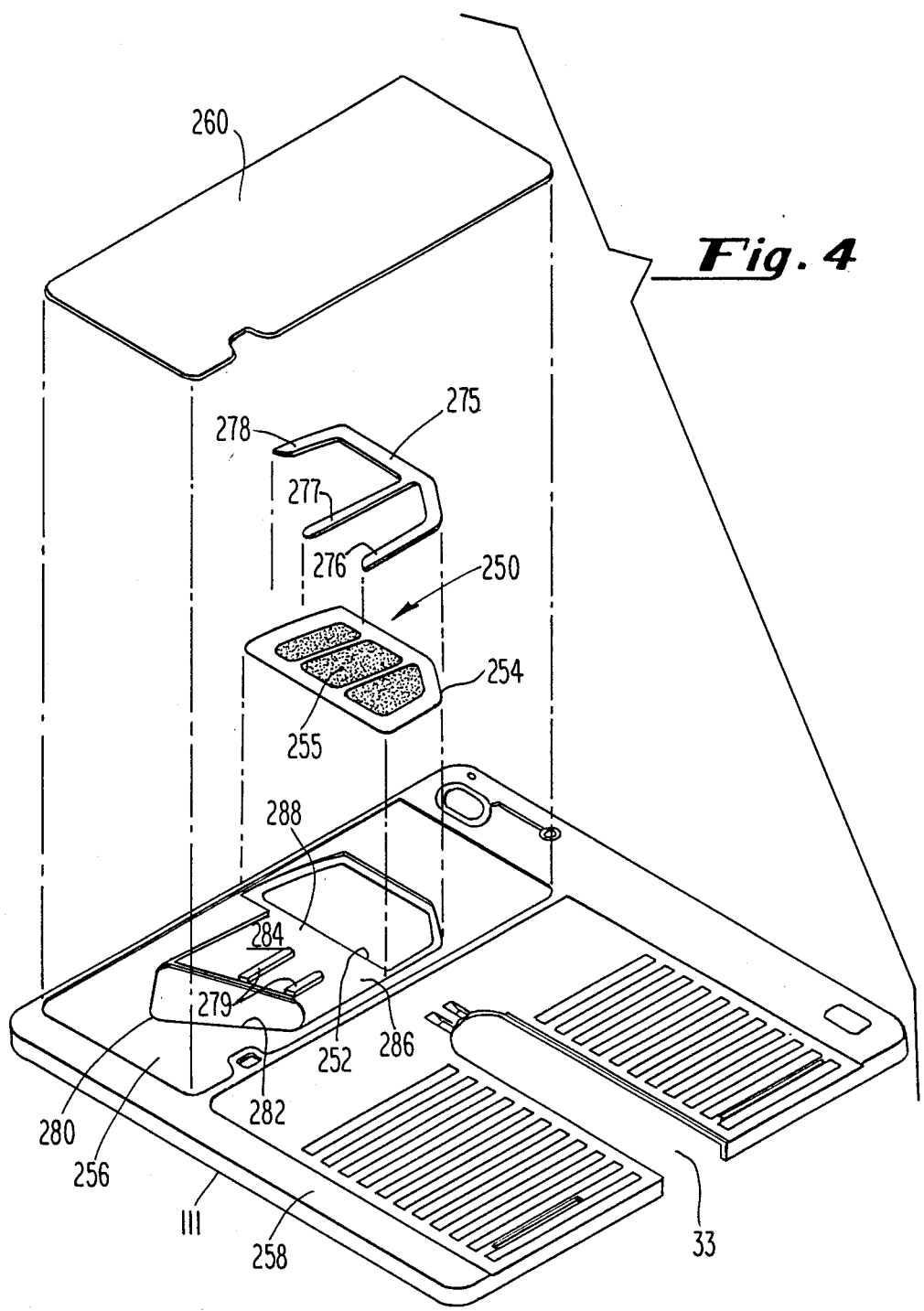
FIG. 4 is an exploded view of the opposite side of the top portion of the cartridge shown in FIG. 1 as modified in accordance with a second embodiment of the present invention.

Referring now to FIGS. 4 and 5, a second embodiment of a cartridge in accordance with the invention is depicted. In this second embodiment of the invention, advantage is taken of the pressure differential or both the high and low pressure zones created within the cartridge when the disk pair 10, 14 is rotated. In this second embodiment of the invention, particulates are removed from the air inside the cartridge, i.e., inside air is filtered; outside air is not drawn into the cartridge through the filter.

As in the first embodiment of the invention, the filter 250 is located in opening 252 or is disposed in recessed area 262 when cover 260 is in place. Positioned on top of filter frame 254 is a support member 275 which is positioned above the filter 250 and below the cover 260. The legs 276, 277, and 278 provide support under the thin cover plate 260 to prevent buckling of the cover plate over the filter 250 and an air channel to be described hereinafter. Since outside air is not drawn into the cartridge in this second embodiment of the invention, the slot or air inlet 264 of FIG. 2 is omitted. Shown at 280 is an elongated inlet. Inlet 280 is comprised of an opening 282 in the top portion 111. With cover plate 260 in position on the outside surface 256 the opening 282 is closed, i.e., the opening 282 terminates at the cover plate 260, however, the inlet 280 communicates with an air flow channel or passage 284 defined by the cover plate 260 and an elongated recessed area 286 provided in the recessed surface 256 of cartridge top portion 111. The air flow channel 284 passes under the wiper 115 and has an outlet 288 which is in or communicates with the recessed area 262 in which the filter 250 is disposed. The legs 276 and 277 of support member 275 extend onto recessed surface 286 and have a thickness substantially equal to the height of the nodes 279 thereby providing support for the cover plate 260 over air channel 284. Since the filter 250 is disposed in the low pressure zone when the disk pair 10, 14 is rotated and the inlet 280 is in the high pressure zone, air circulating in the cartridge is forced into the inlet 280, under the wiper 115 or through air flow channel 284, and exits through outlet 288 into and through filter 250 and back into the interior of the cartridge. Again, the filtered air provides an improved environment for the operation of the transducer to disk interface.

Figure 7:
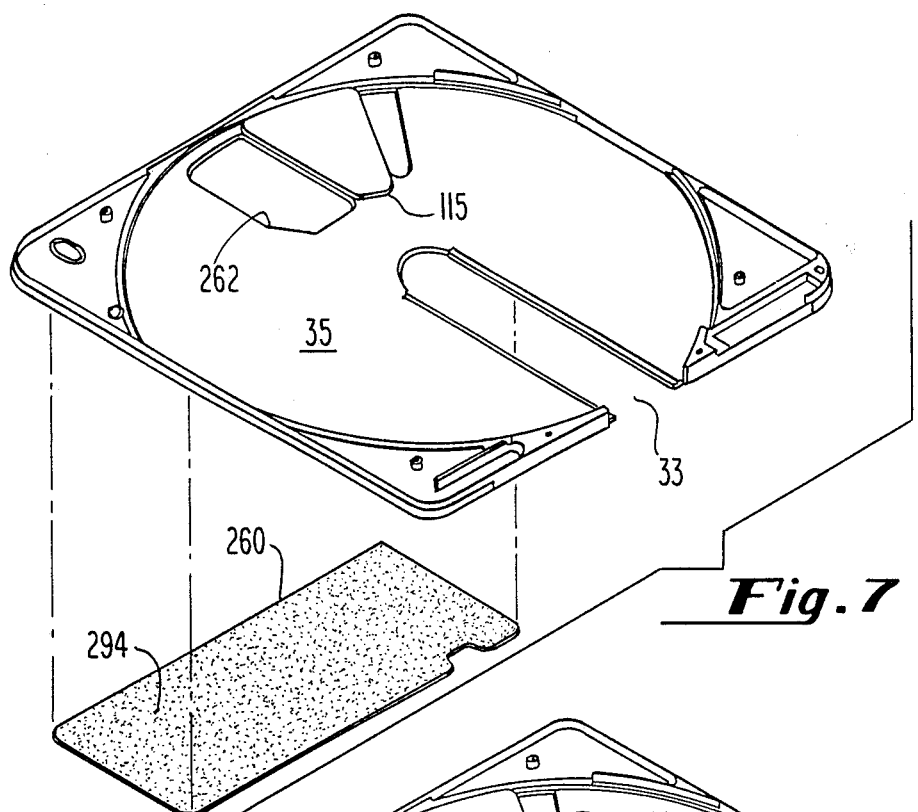
FIG. 7 is a view of the opposite side of FIG. 6.

Referring now to FIGS. 6 and 7, a third embodiment of the cartridge in accordance with the invention is depicted. In this third embodiment of the invention, advantage is taken of both the high and low pressure zones created within the cartridge when the disk pair 10, 14 is rotated. In this third embodiment of the invention, particulates are removed from the air inside the cartridge; outside air is not drawn into the cartridge.

Shown at 294 in FIG. 6 is the particulate removing means in accordance with the invention that is utilized in this third embodiment of the cartridge. The particulate removing means 294 comprises an adhesive lining the inside surface of the cover plate 260 and thus the air flow channel 284. Particulates in the air stream passing through air flow channel 284 which come in contact with the adhesive lining 294 will tend to become lodged in or adhere to the adhesive 294 and in this manner be removed from the air in the cartridge which comes in contact with the disks 10, 14. A suitable adhesive for use is Scotch 9571 brand laminating adhesive, manufactured by 3M Company. The adhesive lining 294 may extend across all or a part of the air channel 284 from the high pressure zone to the low pressure zone.

Figure 9:
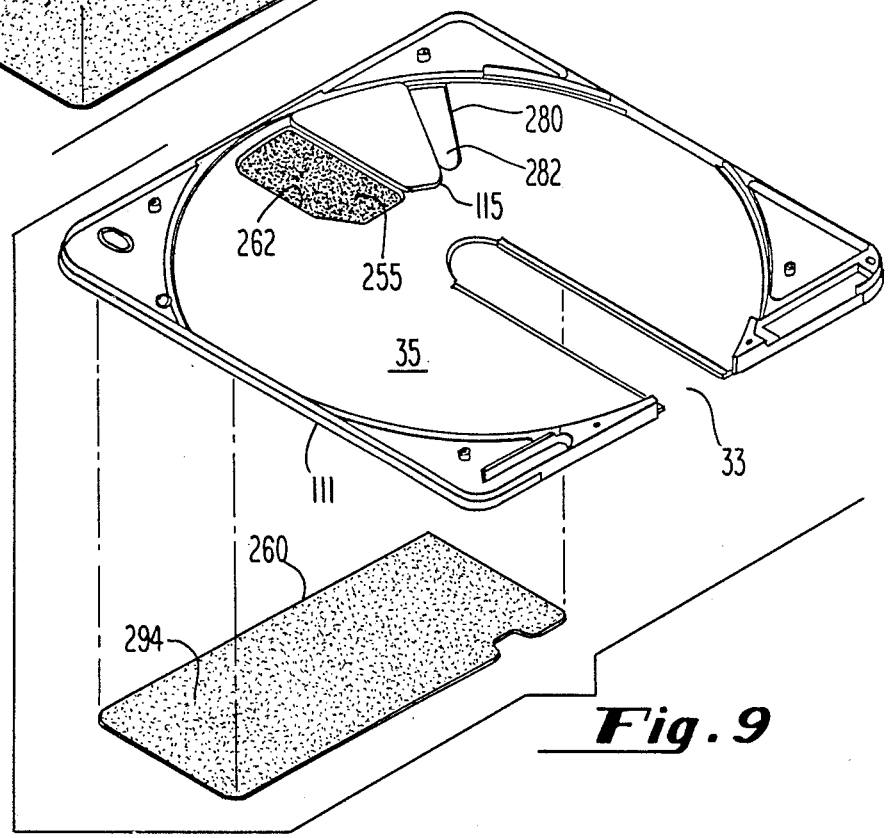
FIG. 9 is a view of the opposite side of FIG. 8.

Referring now to FIGS. 8 and 9, a fourth embodiment of a cartridge in accordance with the invention is depicted. This fourth embodiment is the most preferred embodiment of the invention and essentially combines features of the first three embodiments into a single cartridge. As in the first embodiment, with cover plate 260 in position, filter 250 is disposed in recessed area 262 provided in the inside surface 35 of cartridge top portion 111. As in the second embodiment, inlet 280 is provided in top portion 111 which communicates with air flow channel 284. In this fourth embodiment, an additional leg 298 is provided on support member 275 and forms a barrier separating the outside air drawn into the enclosure via air inlet 264 and channel 266 from air passing through the air flow channel 284. The filter 250 extends across both the air flow channel outlet 288 and the air channel 266 of air inlet 280. The adhesive 294 lines the air flow channel 284 as in the third embodiment of the invention. It will be readily understood from the foregoing description of the most preferred embodiment of the invention that advantage is taken of both the high and low pressure zones created within the cartridge when disk pair 10, 14 is rotated and that particulates are removed from both the inside air as it passes through filter 250 and outside air drawn into the cartridge as it too passes through filter 250. In addition, the air inside the cartridge passing under wiper 115 and passing through air flow channel 284 may also have particulates entrained therein removed therefrom due to the adhesive lining 294 in air flow channel 284.

In each of the four embodiments of the invention thus far described and in the remaining embodiment to be described, the particulate removing means, which comprises the filter 250 or adhesive 294 or the combination of the filter 250 and adhesive 294, is positioned in operative relationship to the enclosure (formed by the cartridge top portion 111 and bottom portion 112) and the high and low pressure zones, which zones are effected by the rotation of the disks 10, 14. Furthermore, in all embodiments of the invention described herein, the particulate removing means has been described as being disposed in at least the low pressure zone. Of course, the particulate removing means can be physically disposed in the high pressure zone if so desired. Furthermore, in the case of the adhesive being used as a particulate removing means, either alone or in conjunction with a filter means, the adhesive may be disposed in the high pressure zone and extend to and into the low pressure zone.

Figure 10:
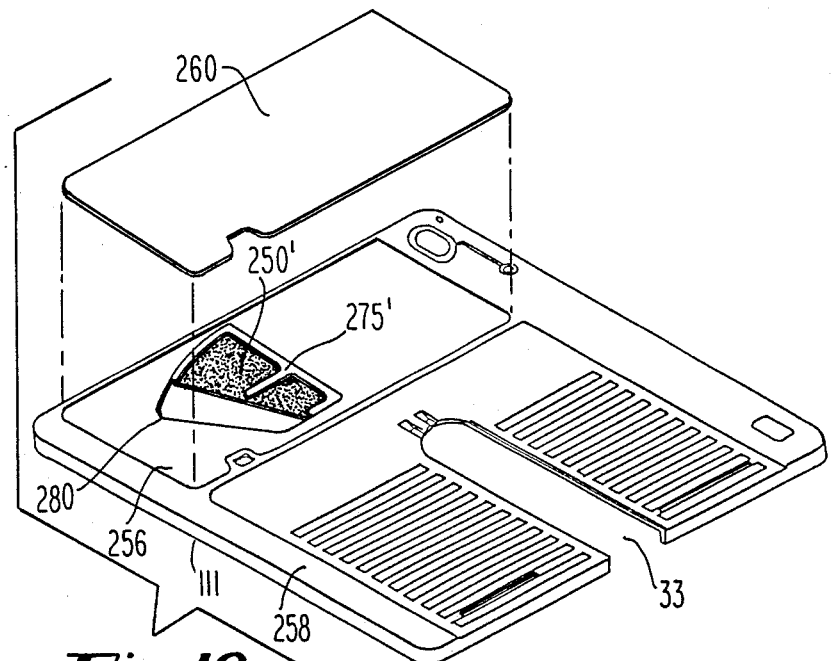
FIG. 10 is an exploded view of the opposite side of the top portion of the cartridge shown in FIG. 1 as modified in accordance with a fifth embodiment of the present invention.
Figure 11:
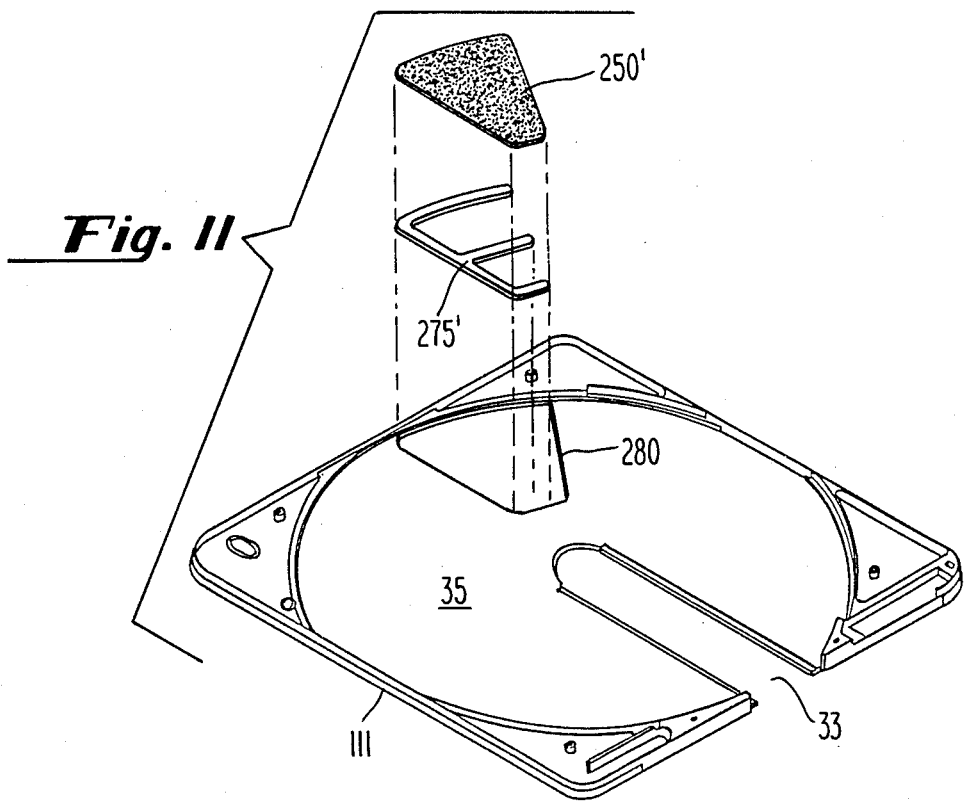
FIG. 11 is a view of the opposite side of FIG. 10.

Referring now to FIGS. 10 and 11, a fifth embodiment of a cartridge in accordance with the invention is depicted. In this fifth embodiment of the invention, advantage is taken of the pressure differential of both the high and low pressure zones created within the cartridge when the disk pair 10, 14 is rotated. In this fifth embodiment of the invention, particulates are removed from the air inside the cartridge, i.e., inside air is filtered; outside air is not drawn into the cartridge through the filter.

In this fifth embodiment of the invention, the particulate removing means or filter 250 and wiper 115 are combined into a single element 250'. As in the second embodiment of the invention, the elongated inlet 280 is provided in the top portion 111. The inlet 280 communicates with the air flow channel defined between the cover plate 260 and the rear of the filter 250'. A support member 275' provides support for the cover plate 260 over the filter/wiper 250'. Since the inlet is provided in the high pressure zone, air circulating in the cartridge is forced into the inlet 280, along air channel and under and up through filter/wiper 250'. The filtered air provides an improved atmosphere for the operation of the transducer to disk interface. If desired, an adhesive may be applied to cover plate 260 as described in conjunction with the third embodiment of the invention depicted in FIGS. 6 and 7.

The five embodiments of the invention have been shown and described as useful in a magnetic disk cartridge having two rotatable flexible magnetic disks mounted therein; however, it is to be understood that the concepts of this invention are fully applicable to any type cartridge having any type recording media therein. Furthermore, it is within the scope of the present invention to combine the functions of the filter 250 and wiper 115, as described in the fifth embodiment of the invention, in the first and fourth embodiments of the invention. It is also within the scope of the present invention to provide an air outlet, which would communicate directly to the outside of the cartridge, in the high pressure zone of the cartridge to permit or force air to exit the cartridge carrying with it any particulates contained therein.

While the present exemplary embodiments of this invention have been illustrated and described, it will be recognized that this invention may be otherwise variously embodied and practiced within the scope of the following claims.

What is claimed is:

1. A magnetic disk cartridge of the type having a Bernoulli surface against which flexible magnetic disk means is rotated, said cartridge comprising:
   (a) an enclosure having a generally planar top portion and a generally planar bottom portion, said magnetic disk means being rotatably mounted within a chamber formed between said top and bottom portions, the underside of one of said top and bottom portions comprising said Bernoulli surface against which said flexible magnetic disk means is rotated;
   (b) a disk wiper secured to said cartridge and in contact with said Bernoulli surface and one of the surfaces of said flexible magnetic disk means, rotation of said flexible magnetic disk means effecting a high pressure zone on one side of said disk wiper and a low pressure zone on the opposite side of said disk wiper;
   (c) filtration means for filtering air which flows in proximity to said flexible magnetic disk means; and
   (d) an air flow channel having an inlet in said high pressure zone and an outlet in said low pressure zone, said air flow channel extending under said disk wiper and said filtration means being disposed across said air channel outlet in said low pressure zone.

2. A magnetic disk cartridge as recited in claim 1 wherein said enclosure includes an air inlet means for permitting outside air to be drawn into said enclosure through said filtration means.

3. A magnetic disk cartridge as recited in claim 2 wherein said air inlet means of said enclosure includes an outlet means in said low pressure zone and wherein said filtration means is disposed across said outlet means in said low pressure zone.

4. A magnetic disk cartridge as recited in claim 1 wherein said filtration means extends across both of said air flow channel and said air channel outlet and said enclosure further includes a barrier means, said barrier means separating the outside air drawn into said enclosure from air passing through said air flow channel.

5. A magnetic disk cartridge as recited in claim 4 wherein said air flow channel includes adhesive means lining said air flow channel.

6. A cartridge, having recording media rotatably mounted therein, said cartridge comprising:
   an enclosure substantially surrounding said media thereby defining a chamber, wherein a differential pressure region is created within said chamber when said media is rotating, said enclosure having a passage formed therein, wherein at least one end of said passage is in communication with said differential pressure region so that air moves through said passage; and
   a filtering member, positioned within said passage, for removing particulate material from air which flows through said passage.

7. The cartridge of claim 6, wherein said filtering member comprises a surface having an adhesive coating thereon, wherein said adhesive coating serves to capture particulate material passing through said passage.

8. The cartridge of claim 6, wherein said filtering member comprises a filter media positioned so that air passing through said passage passes through said filter media.

9. The cartridge of claim 8, wherein said filter media comprises Filtrete brand air filter media.

10. The cartridge of claim 6, wherein said differential pressure region comprises a high pressure region and a low pressure region and wherein said passage has one end in communication with said high pressure region and another end in communication with said low pressure region.

11. A cartridge as recited in claim 10, which further comprises:
   a wiper, said wiper being secured within said enclosure and in contact with said recording media, said high pressure zone being located on one side of said wiper and said low pressure zone being located on the opposite side of said wiper.

12. The cartridge of claim 10, wherein said passage is formed in the exterior surface of said cartridge.

13. The cartridge of claim 12, further comprising a cover for sealing said passage from air outside of said chamber.

14. The cartridge of claim 6, wherein the other end of said passage is in communication with air outside of said enclosure.

* * * * *